(12) United States Patent
Bikumala et al.

(10) Patent No.: US 11,757,986 B2
(45) Date of Patent: Sep. 12, 2023

(54) IMPLEMENTING AN INTELLIGENT NETWORK OF DISTRIBUTED COMPUTE NODES

(71) Applicant: Dell Products L.P., Round Rock, TX (US)

(72) Inventors: Sathish K. Bikumala, Round Rock, TX (US); Jace W. Files, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 322 days.

(21) Appl. No.: 17/078,524

(22) Filed: Oct. 23, 2020

(65) Prior Publication Data

US 2022/0131931 A1 Apr. 28, 2022

(51) Int. Cl.
*H04L 67/101* (2022.01)
*G06F 16/23* (2019.01)
*G06F 9/50* (2006.01)
*H04L 67/1008* (2022.01)

(52) U.S. Cl.
CPC .......... *H04L 67/101* (2013.01); *G06F 9/5083* (2013.01); *G06F 16/2379* (2019.01); *H04L 67/1008* (2013.01)

(58) Field of Classification Search
CPC .............. H04L 67/101; H04L 67/1008; G06F 16/2379; G06F 9/5083
See application file for complete search history.

(56) References Cited

U.S. PATENT DOCUMENTS

| | | | |
|---|---|---|---|
| 8,295,201 B2* | 10/2012 | So | H04L 45/124 370/254 |
| 9,497,136 B1* | 11/2016 | Ramarao | H04L 47/78 |
| 10,511,657 B2 | 12/2019 | Torpy et al. | |
| 10,567,248 B2 | 2/2020 | Chu et al. | |
| 2015/0149611 A1* | 5/2015 | Lissack | G06F 9/45558 709/224 |
| 2017/0026263 A1* | 1/2017 | Gell | H04L 67/1023 |
| 2017/0366606 A1* | 12/2017 | Ben-Shaul | H04L 67/2876 |
| 2020/0037178 A1 | 1/2020 | Gibson et al. | |
| 2020/0312005 A1 | 10/2020 | Desai et al. | |
| 2021/0012282 A1* | 1/2021 | Smith | G06F 16/2379 |
| 2021/0014114 A1* | 1/2021 | Doshi | H04L 41/5019 |

* cited by examiner

*Primary Examiner* — Kristie D Shingles
(74) *Attorney, Agent, or Firm* — Ryan, Mason & Lewis, LLP

(57) ABSTRACT

Methods, apparatus, and processor-readable storage media for implementing an intelligent network of distributed compute nodes are provided herein. An example computer-implemented method includes processing information pertaining to multiple compute nodes within a network of distributed compute nodes; mapping available compute nodes, within the network, having compute capabilities and bandwidth capabilities for executing compute tasks onto dedicated portions of the network; processing information pertaining to at least one compute task requested within the network, including determining at least bandwidth requirements for the compute task and latency requirements for the compute task; and performing, based on the mapping and the processed information pertaining to the compute task, at least one automated action pertaining to allocating at least a portion of the compute task to at least one of the available compute nodes within the network.

20 Claims, 7 Drawing Sheets

IMPLEMENTING AN INTELLIGENT NETWORK OF DISTRIBUTED COMPUTE NODES

FIELD

The field relates generally to information processing systems, and more particularly to computation architecture in such systems.

BACKGROUND

As computation tasks become more specialized and/or distributed across a network infrastructure, a need exists to be able to direct computation efforts to the best suited compute node(s). For example, a particular user device or edge compute node may not be the most optimized location for certain compute-intensive tasks, especially if specialized hardware (e.g., hardware that may be located, in-part or in-full, on other devices and/or nodes) can accelerate certain such tasks. However, conventional network management techniques typically fail to allocate compute tasks on such bases due, for example, to latency and bandwidth limitations.

SUMMARY

Illustrative embodiments of the disclosure provide techniques for implementing an intelligent network of distributed compute nodes. An exemplary computer-implemented method includes processing information pertaining to multiple compute nodes within at least one network of distributed compute nodes, and mapping one or more available compute nodes, within the at least one network, having compute capabilities and bandwidth capabilities for executing one or more compute tasks onto one or more dedicated portions of the at least one network. The method also includes processing information pertaining to at least one compute task requested within the at least one network of distributed compute nodes, wherein processing the information pertaining to the at least one compute task includes determining at least one or more bandwidth requirements for the at least one compute task and one or more latency requirements for the at least one compute task. Further, the method includes performing, based at least in part on the mapping of the one or more available compute nodes and the processed information pertaining to the at least one compute task, at least one automated action pertaining to allocating at least a portion of the at least one compute task to at least one of the one or more available compute nodes within the at least one network.

Illustrative embodiments can provide significant advantages relative to conventional network management techniques. For example, problems associated with inefficient allocation of compute tasks to compute nodes due to latency and bandwidth limitations are overcome in one or more embodiments through automatically mapping available compute nodes within a network onto dedicated portions of the network in connection with optimizing task allocation.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
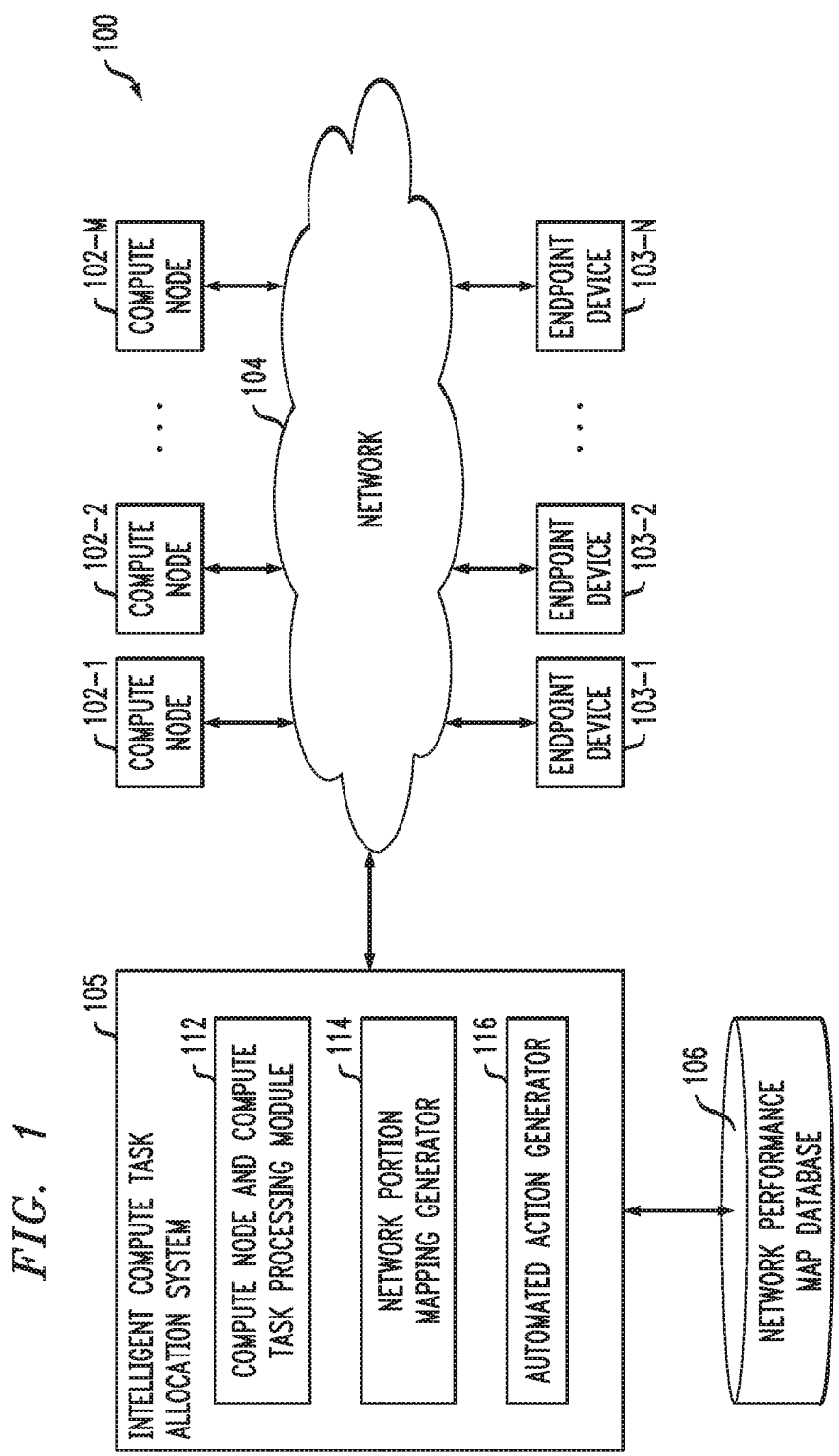
FIG. 1 shows an information processing system configured for implementing an intelligent network of distributed compute nodes in an illustrative embodiment.

FIG. 1 shows a computer network (also referred to herein as an information processing system) 100 configured in accordance with an illustrative embodiment. The computer network 100 comprises a plurality of compute nodes 102-1, 102-2, . . . 102-M, collectively referred to herein as compute nodes 102, and also comprises a plurality of endpoint devices 103-1, 103-2, . . . 103-N, collectively referred to herein as endpoint devices 103. The compute nodes 102 and endpoint devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is intelligent compute task allocation system 105.

The compute nodes 102 may comprise, for example, edge infrastructure systems and/or centralized cloud data centers. Additionally or alternatively, compute nodes 102 may broadly comprise shared resources on a network edge and/or in the cloud and/or core.

The endpoint devices 103 (also referred to herein as user devices and/or edge devices) may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The compute nodes 102 and/or endpoint devices 103 in some embodiments comprise respective computing systems and/or devices associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, intelligent compute task allocation system 105 can have an associated database 106 configured to store data pertaining to at least one network performance map, which comprise, for example, network parameters and compute node parameters such as endpoint-to-endpoint latency, endpoint-to-endpoint bandwidth available, node compute ability, node compute availability, etc.

The network performance map database 106 in the present embodiment is implemented using one or more storage systems associated with intelligent compute task allocation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with intelligent compute task allocation system 105 can be one or more input-output devices, which illustratively comprise keyboards, displays or other types of input-output devices in any combination. Such input-output devices can be used, for example, to support one or more user interfaces to intelligent compute task allocation system 105, as well as to support communication between intelligent compute task allocation system 105 and other related systems and devices not explicitly shown.

Additionally, intelligent compute task allocation system 105 in the FIG. 1 embodiment is assumed to be implemented using at least one processing device. Each such processing device generally comprises at least one processor and an associated memory, and implements one or more functional modules for controlling certain features of intelligent compute task allocation system 105.

More particularly, intelligent compute task allocation system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows intelligent compute task allocation system 105 to communicate over the network 104 with endpoint devices 103 and compute nodes 102, and illustratively comprises one or more conventional transceivers.

The intelligent compute task allocation system 105 further comprises a compute node and compute task processing module 112, network portion mapping generator 114, and an automated action generator 116.

It is to be appreciated that this particular arrangement of modules 112, 114 and 116 illustrated in intelligent compute task allocation system 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for implementing an intelligent network of distributed compute nodes 102 and endpoint devices 103 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, intelligent compute task allocation system 105 and network performance map database 106 can be on and/or part of the same processing platform.

An exemplary process utilizing modules 112, 114 and 116 of an example intelligent compute task allocation system 105 in computer network 100 will be described in more detail with reference to the flow diagram of FIG. 6.

Accordingly, at least one embodiment includes generating and/or implementing an intelligent network of distributed compute nodes. As detailed herein, networks can be configurable on an ad hoc basis based at least in part on the needs of the given network. For example, 5G wireless connectivity can provide hyper connectivity between devices (e.g., Internet of Things (IoT) devices, machines and other processing devices, etc.), with the value of such connections being represented, at least in part, in the data interchange between them.

Accordingly, one or more embodiments include mapping available distributed network compute nodes (e.g., in approximately real-time) onto dedicated portions of a given network (also referred to herein as network slices). Such mapping can include processing information pertaining, for example, to current compute loads, latency and bandwidth of each compute node, and compute capability (e.g., graphics processing unit (GPU), central processing unit (CPU), neural network capabilities, memory, storage, and/or other specific or specialized hardware, etc.). Additionally, such an embodiment also includes providing the ultimate mapping(s) to user devices and/or edge compute nodes within the given network. Using this information, user devices and/or edge compute nodes can send application data and tasks to one or more optimized compute nodes within the given network on a task-by-task and/or thread-by-thread basis to improve and/or optimize total processing time.

Additionally, in at least one embodiment, a network performance map can be updated based at least in part on such mapping information (e.g., updated in approximately real time) to show network and system performance as well as to facilitate routing compute tasks to the most optimized (available) compute nodes within the network.

Figure 2:
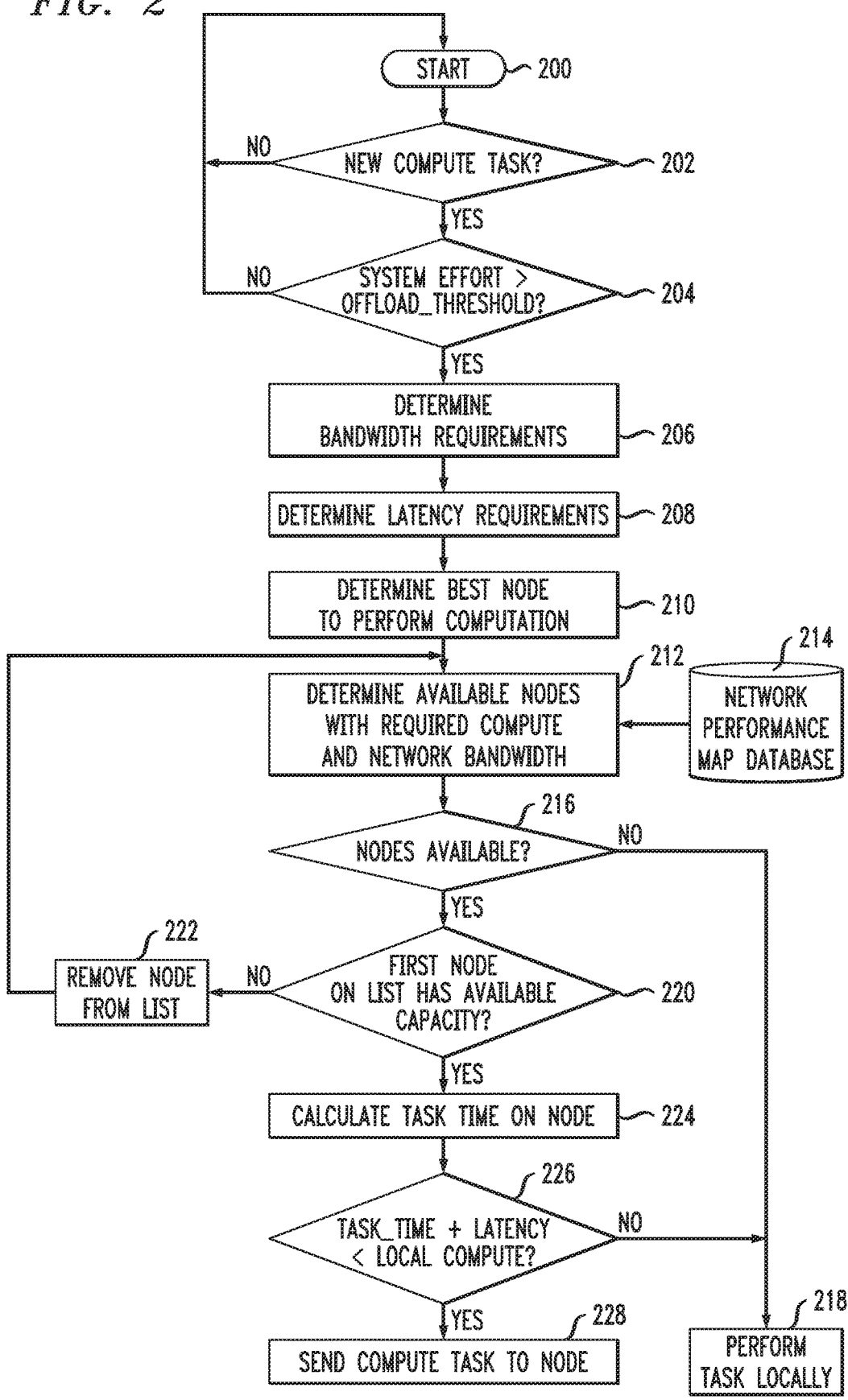
FIG. 2 shows a flow chart for determining a compute node for a compute task in an illustrative embodiment.

FIG. 2 shows a flow chart for determining a compute node for a compute task in an illustrative embodiment. Such a workflow starts at step 200, and step 202 includes determining if there is a new compute task to consider. If no (that is, there is no new compute task), then the workflow reverts to step 200. If yes (that is, there is a new compute task), then step 204 includes determining whether system effort is greater than a given offload threshold. As used herein, system effort refers to the time and/or energy a system requires to complete a discrete compute task. For example, a five minute video could take thirty minutes to encode on an endpoint device, but only one minute to encode on a local compute node. The offload threshold can be configurable, but in a generic form, such a threshold refers to the point at which sending a task to a compute node takes less time than processing the task locally. The offload threshold includes the latency to send the data, plus processing time, plus the latency to receive the data back.

Referring again to step 204, if no (that is, system effort is not greater than the offload threshold), then the workflow reverts to step 200. If yes (that is, system effort is greater than the offload threshold), then step 206 includes determining bandwidth requirements for the new compute task and step 208 includes determining latency requirements for the new compute task.

Based at least in part on the determined bandwidth and latency requirements, step 210 (which can, in one or more embodiments, encompass steps 212 through 228) includes determining the best compute node(s) within the network to perform the computation (i.e., the new compute task). Accordingly, step 212 includes determining available compute nodes having the required compute and bandwidth capabilities within the network, wherein such a determination can be carried out using information from a network performance map database 214. In conjunction with step 212, step 216 includes determining whether any such compute nodes are available. If no (that is, no such compute nodes are available), then the workflow continues to step 218, which includes performing the new compute task locally (that is, the task is computed on the endpoint device that needs or requests the task to be performed). If yes (that is, one or more such compute nodes are available), then the workflow continues to step 220, which includes determining whether the first compute node on the list of available compute nodes has sufficient available capacity. If no (that is, the first node does not have sufficient available capacity), then that node is removed from the list in step 222, and the workflow reverts to step 212. If yes (that is, the first node does have sufficient available capacity), then task time on the node is calculated in step 224.

One or more embodiments can include utilizing many techniques to calculate a task time. By way merely of example, such a technique can include running a certain percentage (1%, for example) of the task, discarding the startup and/or loading time, and multiply the completed run-time to get the full time (e.g., multiply the run time for completing 1% of the task by 100). Another example technique can include maintaining a table representing previous compute times of tasks and their compute parameters. Such a table can be continuously updated with tasks and their compute times and/or resources, and can be used to determine compute times for one or more additional tasks.

Referring again to FIG. 2, step 226 includes determining whether the calculated task time plus the required latency is less than a local compute node time estimation. In one or more embodiments, the value of this local compute node time estimation would be normalized to a performance measurement based on the task to be computed. For example, CPU-intensive tasks would measure CPU performance. More generally, in accordance with at least one embodiment, each compute node can have a benchmark performance for each task type.

Referring again to step 226, if no (that is, the calculated task time plus the required latency is not less than the local compute node time estimation), then the workflow continues to step 218, which includes performing the new compute task locally. If yes (that is, the calculated task time plus the required latency is less than the local compute node time estimation), then step 228 includes sending the new compute task to the given compute node.

As noted above and exemplary illustrated in FIG. 2, one or more embodiments include generating and maintaining a network performance map database. In such an embodiment, each network and compute node parameter is kept updated in such a database, and such parameters can include, for example, endpoint-to-endpoint latency, endpoint-to-endpoint bandwidth available, node compute ability (referenced, for example, from a given baseline, and which can be based at least in part on CPU, GPU, memory, neural network ability, quantum compute ability, etc.), node compute available, etc.

Additionally, in at least one embodiment, a network performance map database uses a ping mechanism on a periodic basis to determine endpoint-to-endpoint latency. The periodic basis can, for example, be static or it can be varied based on usage and/or channel connection changes.

As also detailed herein, a node compute ability field indicates the capabilities of a given node. Such a measure can, for example, be relative to each endpoint or can be based at least in part on one or more applicable benchmarks. Such benchmarks can include, for instance, CPU compute (e.g., single thread versus multi-thread) capacity, GPU compute ability, memory, neural network ability, quantum compute ability, etc. Additionally, as noted herein, a node compute availability parameter tracks the percentage of compute power available in real-time. In one or more embodiments, this parameter is pushed from each compute node as one or more conditions change.

Also, in at least one embodiment, when an endpoint has determined that it (that is, the endpoint) will use a given node's capacity, the endpoint can reserve this capacity in the network performance map database, for example, to avoid other endpoints from using this capacity during the transit of the compute task. One or more embodiments can also include extending such techniques to network bandwidth, for example, by creating and/or adopting at least one network slice specifically for the given task.

Figure 3:
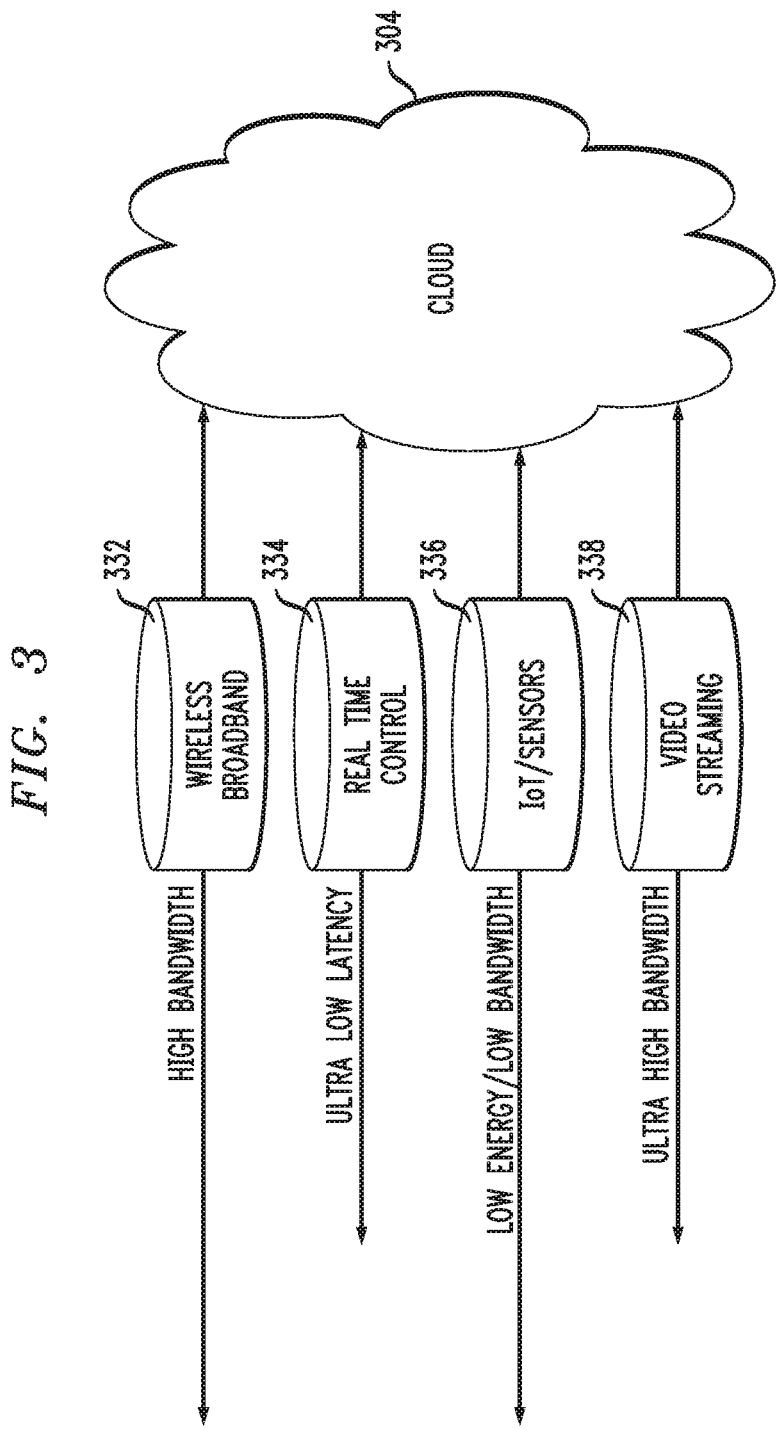
FIG. 3 shows an example of network slicing in an illustrative embodiment.

FIG. 3 shows an example of network slicing in an illustrative embodiment. More specifically, the example embodiment illustrated in FIG. 3 shows 5G network slices which include a wireless broadband slice 332 (which can be used, for example, in connection with high bandwidth tasks), a real-time control slice 334 (which can be used, for example, in connection with ultra-low latency tasks), an IoT and/or sensor slice 336 (which can be used, for example, in connection with low energy usage and/or low bandwidth tasks), and a video streaming slice 338 (which can be used, for example, in connection with ultra-high bandwidth tasks).

In accordance with one or more embodiments, network slicing refers to the separation of multiple virtual networks that operate on the same physical hardware for different applications, services, and/or purposes. Such a form of virtual network architecture combines principles behind software defined networking (SDN) and network functions virtualization (NFV) on a fixed network to increase flexibility.

Additionally, in at least one embodiment, network slicing separates the control plane (CP) from the user plane to move user plane functionality towards the network edge. In such an embodiment, each network slice can have its own architecture, provisioning management, and/or security that supports a particular use case. Functions such as, for example, speed, capacity, connectivity and coverage can be allocated to meet the requirements of one or more objectives of the particular use case.

In one or more embodiments, in providing a connection that has low latency and adequate bandwidth, the prioritization of different tasks can be performed on a software-level division of the network. The slices that occupy a single physical network can be separated, meaning that traffic and security breaches from one slice cannot interfere with another slice.

Figure 4:
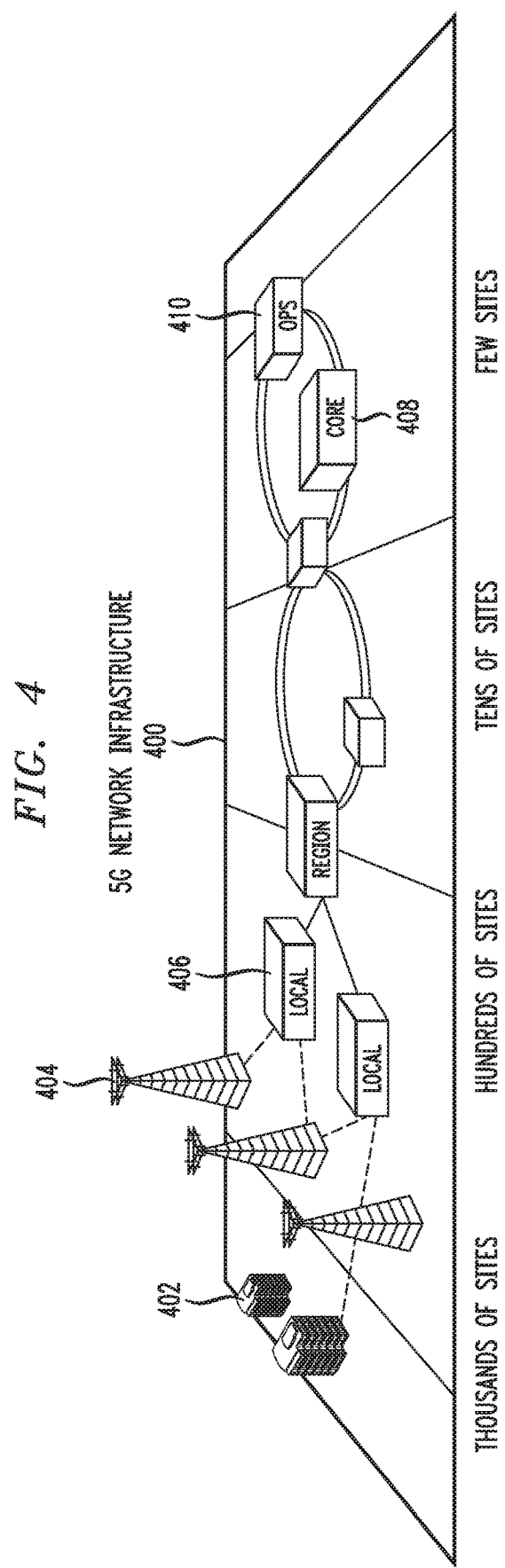
FIG. 4 shows example fifth generation (5G) network infrastructure in an illustrative embodiment.
Figure 5:
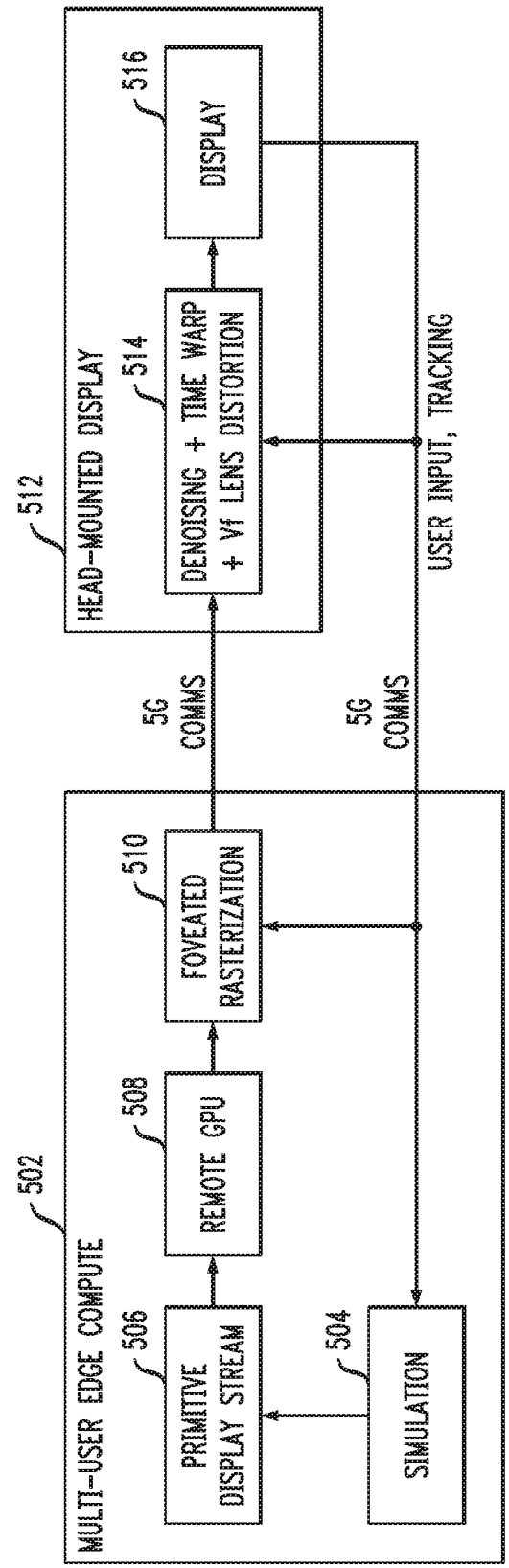
FIG. 5 shows an enabled virtual reality (VR) example use case in an illustrative embodiment.

By way merely of illustration, example use cases implementing one or more embodiments are depicted in FIG. 4 and FIG. 5. As detailed below, FIG. 4 illustrates a use case demonstrating the usefulness of having remote GPU abilities available, and FIG. 5 illustrates a use case demonstrating a need for the best latency while having heavy GPU and CPU requirements.

FIG. 4 shows example 5G network infrastructure in an illustrative embodiment. By way of illustration, FIG. 4 depicts a 5G network infrastructure 400 that includes user device 402 (e.g., a laptop; also referred to as Location A), a first server 404 (also referred to as Location B), a second server 406 (also referred to as Location C), a server farm 408 with neural network hardware (also referred to as Location D), and a server farm 410 with quantum computing capabilities (also referred to as Location E).

In the example embodiment illustrated in FIG. 4, laptop device 402 can be used to render three-dimensional (3D) objects using computer-aided design (CAD) software. Rendering 3D objects on the limited compute power of a laptop device would reduce the frame rate to only a few frames per second, and the 3D objects would be interacted with via the touch interface on the device. Using intelligent compute network mapping in accordance with one or more embodiments, a virtual compute algorithm (e.g., such as detailed in connection with FIG. 2) processes the touch interactions from the laptop 402 (CPU), while the CAD software user interface (UI) and/or one or more additional processes can be sent to edge compute node 404 (Location B) for processing, and the 3D rendering can be distributed to a GPU array in the network 406 (Location C).

In such an embodiment, the virtual compute algorithm generates and maintains an updated network map of available resources in at least one network and the latency and bandwidth available to each resource in the at least one network. Additionally, the virtual compute algorithm assesses the bandwidth requirements and latency requirements for each task and assigns the tasks to specific compute nodes to optimize efficiency and/or total processing time. As network conditions change, the virtual compute algorithm can redirect each task to an optimized compute node in real time.

FIG. 5 shows an enabled VR example use case in an illustrative embodiment. In connection with the example embodiment illustrated in FIG. 5, assume a use case wherein a fire department is using VR to train new recruits in a simulation of a large building fire. VR applications commonly have specific compute and latency requirements, particularly in connection with a coordinated, live training situation.

Accordingly, as illustrated, FIG. 5 depicts a multi-user edge compute node 502 and head-mounted display 512. Within compute node 502, remote GPU 508 converts the primitive display stream 506 comprising vector graphics format (shapes) instructions into rendered frames. Foveated rasterization 510 is the process of taking an image described in a vector graphics format (from remote GPU 508) and converting the image into a raster image (e.g., a series of pixels, dots or lines, which, when displayed together, create the image which was represented via shapes). In at least one embodiment, foveated rasterization 510 takes the location that a user's eye is focusing on and performs a higher-fidelity rasterization on that area, while using less fidelity on the peripheral areas which are in the user's peripheral vision.

The generated raster image is then output to head-mounted display 512, and more specifically, to component 514, which uses one or more sensors located in a user headset to determine (e.g., using denoising techniques, time warp techniques, and varifocal (Vf) lens distortion techniques) if the user has rotated or moved significantly since the frame was computed. In at least one embodiment, component 514 can alter the image in anticipation that the user has already moved in a certain direction. For example, if the user moves his or her head to the side quickly, the component 514 can rotate the image accordingly so that the user sees a more accurate representation that is consistent with his or her movements. Vf lens distortion compensates the image so that the image appears normal to the user in display 516 (e.g., the display inside the VR headset). In effect, because the eye is typically so close to the VR display 516, the image may often look very distorted, and component 514 can pre-distort the image such that the user sees a normal looking image. The display 516 can then provide input to component 514, component 510, and/or component 504. More specifically, the data flow illustrated in FIG. 5 includes a representation of movement data tracked from the headset (in connection with display 516), which serves as input that is fed to the time warp algorithm (i.e., component 514) and simulation engine 504.

As also depicted in FIG. 5, simulation engine 504 takes the user's movements and determines which part of the virtual environment he or she is looking at. Information pertaining to such a determination is sent to primitive display stream 506, which generates the vector graphic instructions for the remote GPU 508 to render.

In connection with the VR architecture depicted in FIG. 5, one or more embodiments include enabling rendering and one or more compute tasks to be performed in the network. Accordingly, the ability to map a heavy and latency-dependent computing task (as is typically required in VR applications) to the most appropriate node(s) available will greatly improve end-user experience. Additionally, as a user moves in the environment, the most appropriate node for handling a given task may change, and as such one or more embodiments can include facilitating and/or executing a hand-off of the task to another node.

Figure 6:
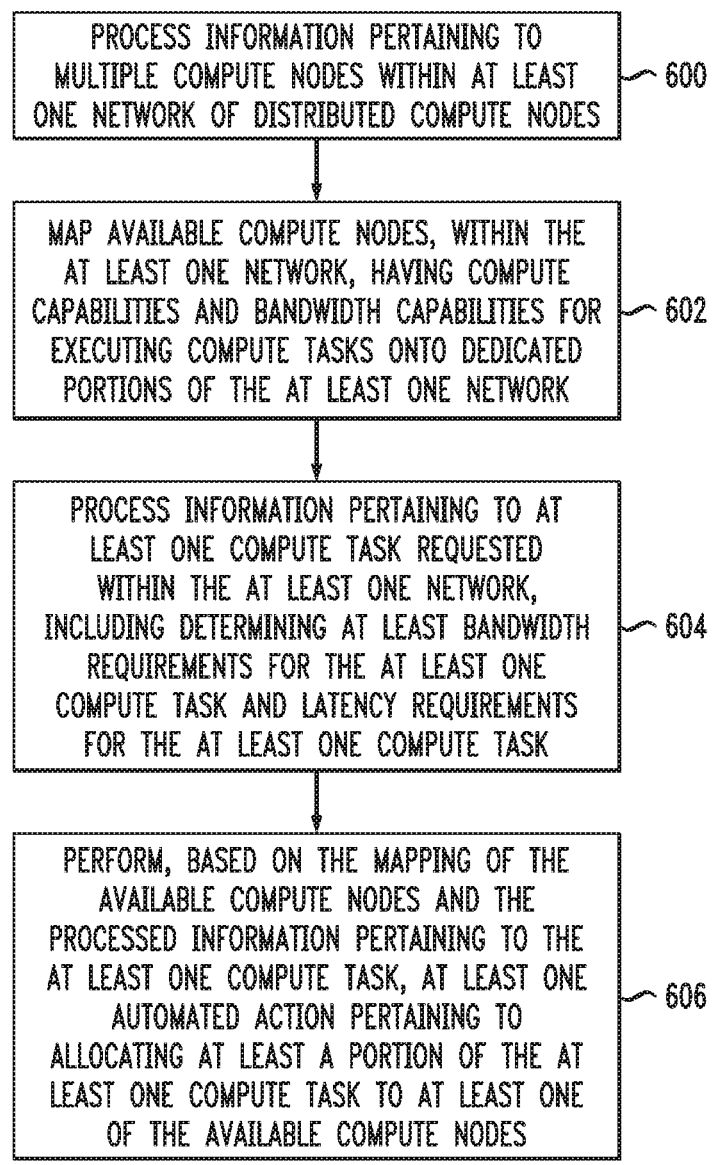
FIG. 6 is a flow diagram of a process for implementing an intelligent network of distributed compute nodes in an illustrative embodiment.

FIG. 6 is a flow diagram of a process for implementing an intelligent network of distributed compute nodes in an illustrative embodiment. It is to be understood that this particular process is only an example, and additional or alternative processes can be carried out in other embodiments.

In this embodiment, the process includes steps 600 through 606. These steps are assumed to be performed by the intelligent compute task allocation system 105 utilizing its modules 112, 114 and 116.

Step 600 includes processing information pertaining to multiple compute nodes within at least one network of distributed compute nodes. In at least one embodiment, processing the information pertaining to multiple compute nodes includes processing information pertaining to two or more of current compute loads within the at least one network, latency associated with each of the multiple compute nodes, bandwidth of each of the multiple compute nodes, and compute capability of each of the multiple compute nodes. Additionally or alternatively, in at least one embodiment, the at least one network of distributed compute nodes includes at least one 5G telecommunications network.

Step 602 includes mapping one or more available compute nodes, within the at least one network, having compute capabilities and bandwidth capabilities for executing one or more compute tasks onto one or more dedicated portions of the at least one network. Step 604 includes processing information pertaining to at least one compute task requested within the at least one network of distributed compute nodes, wherein processing the information pertaining to the at least one compute task comprises determining at least one or more bandwidth requirements for the at least one compute task and one or more latency requirements for the at least one compute task.

Step 606 includes performing, based at least in part on the mapping of the one or more available compute nodes and the processed information pertaining to the at least one compute task, at least one automated action pertaining to allocating at least a portion of the at least one compute task to at least one of the one or more available compute nodes within the at least one network. In at least one embodiment, performing the at least one automated action includes providing the mapping of the one or more available compute nodes to at least a portion of the distributed compute nodes within the at least one network. Such an embodiment can additionally include enabling the at least a portion of the distributed compute nodes to allocate, based at least in part on the mapping of the one or more available compute nodes, at least one of application data and at least one compute task to one or more other compute nodes within the at least one network. Further, in such an embodiment, enabling includes reserving capacity associated with at least a portion of the one or more other compute nodes in response to an indication from given one of the compute nodes that the given compute node will use the capacity associated with the at least a portion of the one or more other compute nodes in connection with executing at least one compute task.

The techniques depicted in FIG. 6 can also include maintaining a network performance map database based at least in part on the processed information pertaining to the multiple compute nodes. In at least one embodiment, maintaining the network performance map database includes updating information pertaining to one or more network parameters and one or more compute node parameters. In such an embodiment, the one or more network parameters include at least one of endpoint-to-endpoint latency and endpoint-to-endpoint available bandwidth, and the one or more compute node parameters include node-specific information pertaining to at least one of central processing unit data, graphics processing unit data, memory data, neural network ability, quantum compute ability, and node compute availability. Additionally, one or more embodiments can include determining, based at least in part on processing the information pertaining to the multiple compute nodes and using at least a portion of the information within the network performance map database, the one or more available compute nodes, within the at least one network, having the compute capabilities and the bandwidth capabilities for executing one or more compute tasks.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically map available compute nodes within a network onto dedicated portions of the network in connection with optimizing task allocation. These and other embodiments can effectively overcome problems associated with inefficient allocation of compute tasks to compute nodes due to latency and bandwidth limitations.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
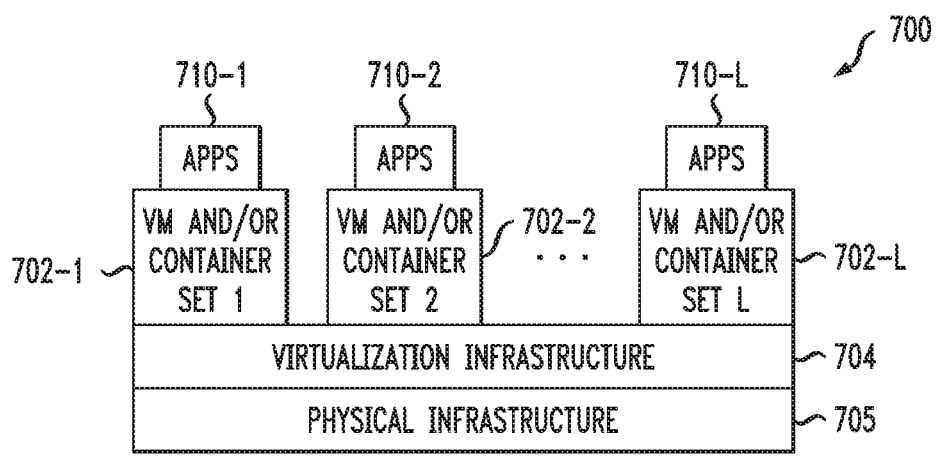
FIGS. 7 and 8 show examples of processing platforms that may be utilized to implement at least a portion of an information processing system in illustrative embodiments.
Figure 8:
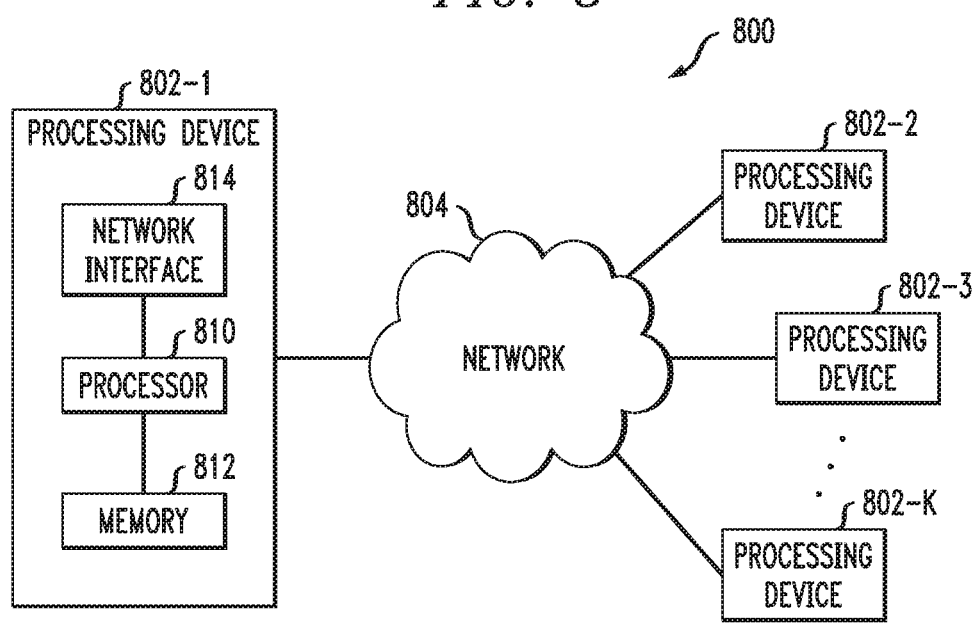

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
processing information pertaining to multiple compute nodes within at least one network of distributed compute nodes;
assigning one or more available compute nodes, within the at least one network, having compute capabilities and bandwidth capabilities for executing one or more compute tasks, to one or more of multiple dedicated portions of the at least one network, wherein each of the multiple dedicated portions of the at least one network is designated based at least in part on a level of bandwidth required for one or more compute tasks to be executed by one or more compute nodes assigned to the dedicated portion of the at least one network;
processing information pertaining to at least one compute task requested within the at least one network of distributed compute nodes, wherein processing the information pertaining to the at least one compute task comprises determining at least one or more bandwidth requirements for the at least one compute task and one or more latency requirements for the at least one compute task; and
performing, based at least in part on the assigning of the one or more available compute nodes and the processed information pertaining to the at least one compute task, at least one automated action pertaining to allocating at least a portion of the at least one compute task to at least one of the one or more available compute nodes within the at least one network, wherein performing at least one automated action comprises reserving, in connection with at least one database associated with the at least one network, capacity associated with at least a portion of the at least one available compute node in response to an indication from a given one of the multiple compute nodes within the at least one network that the given compute node will use the capacity associated with the at least a portion of the at least one available compute node in connection with executing the at least one compute task;
wherein the method is performed by at least one processing device comprising a processor coupled to a memory.

2. The computer-implemented method of claim 1, wherein processing the information pertaining to multiple compute nodes comprises processing information pertaining to two or more of current compute loads within the at least one network, latency associated with each of the multiple compute nodes, bandwidth of each of the multiple compute nodes, and compute capability of each of the multiple compute nodes.

3. The computer-implemented method of claim 1, further comprising:
maintaining the at least one database based at least in part on the processed information pertaining to the multiple compute nodes.

4. The computer-implemented method of claim 3, wherein maintaining the at least one database comprises updating information pertaining to one or more network parameters and one or more compute node parameters.

5. The computer-implemented method of claim 4, wherein the one or more network parameters comprise at least one of endpoint-to-endpoint latency and endpoint-to-endpoint available bandwidth, and wherein the one or more compute node parameters comprise node-specific information pertaining to at least one of central processing unit data, graphics processing unit data, memory data, neural network ability, quantum compute ability, and node compute availability.

6. The computer-implemented method of claim 3, further comprising:
determining, based at least in part on processing the information pertaining to the multiple compute nodes and using at least a portion of the information within the at least one database, the one or more available compute nodes, within the at least one network, having the compute capabilities and the bandwidth capabilities for executing one or more compute tasks.

7. The computer-implemented method of claim 1, wherein performing the at least one automated action comprises providing the assigning of the one or more available compute nodes to at least a portion of the distributed compute nodes within the at least one network.

8. The computer-implemented method of claim 7, further comprising:
enabling the at least a portion of the distributed compute nodes to allocate, based at least in part on the assigning of the one or more available compute nodes, at least one of application data and at least one compute task to one or more other compute nodes within the at least one network.

9. The computer-implemented method of claim 1, wherein the at least one network of distributed compute nodes comprises at least one fifth generation (5G) telecommunications network.

10. A non-transitory processor-readable storage medium having stored therein program code of one or more software programs, wherein the program code when executed by at least one processing device causes the at least one processing device:
to process information pertaining to multiple compute nodes within at least one network of distributed compute nodes;
to assign one or more available compute nodes, within the at least one network, having compute capabilities and bandwidth capabilities for executing one or more compute tasks, to one or more of multiple dedicated portions of the at least one network, wherein each of the multiple dedicated portions of the at least one network is designated based at least in part on a level of bandwidth required for one or more compute tasks to be executed by one or more compute nodes assigned to the dedicated portion of the at least one network;
to process information pertaining to at least one compute task requested within the at least one network of distributed compute nodes, wherein processing the information pertaining to the at least one compute task comprises determining at least one or more bandwidth requirements for the at least one compute task and one or more latency requirements for the at least one compute task; and
to perform, based at least in part on the assigning of the one or more available compute nodes and the processed information pertaining to the at least one compute task, at least one automated action pertaining to allocating at least a portion of the at least one compute task to at least one of the one or more available compute nodes within the at least one network, wherein performing at least one automated action comprises reserving, in connection with at least one database associated with the at least one network, capacity associated with at least a portion of the at least one available compute node in response to an indication from a given one of the multiple compute nodes within the at least one network that the given compute node will use the capacity associated with the at least a portion of the at least one available compute node in connection with executing the at least one compute task.

11. The non-transitory processor-readable storage medium of claim 10, wherein processing the information pertaining to multiple compute nodes comprises processing information pertaining to two or more of current compute loads within the at least one network, latency associated with each of the multiple compute nodes, bandwidth of each of the multiple compute nodes, and compute capability of each of the multiple compute nodes.

12. The non-transitory processor-readable storage medium of claim 10, wherein the program code when executed by the at least one processing device causes the at least one processing device:
to maintain the at least one database based at least in part on the processed information pertaining to the multiple compute nodes, wherein maintaining the at least one database comprises updating information pertaining to one or more network parameters and one or more compute node parameters.

13. The non-transitory processor-readable storage medium of claim 10, wherein performing the at least one automated action comprises providing the assigning of the one or more available compute nodes to at least a portion of the distributed compute nodes within the at least one network.

14. The non-transitory processor-readable storage medium of claim 13, wherein the program code when executed by the at least one processing device causes the at least one processing device:
to enable the at least a portion of the distributed compute nodes to allocate, based at least in part on the assigning of the one or more available compute nodes, at least one of application data and at least one compute task to one or more other compute nodes within the at least one network.

15. An apparatus comprising:
at least one processing device comprising a processor coupled to a memory;
the at least one processing device being configured:
to process information pertaining to multiple compute nodes within at least one network of distributed compute nodes;
to assign one or more available compute nodes, within the at least one network, having compute capabilities and bandwidth capabilities for executing one or more compute tasks, to one or more of multiple dedicated portions of the at least one network, wherein each of the multiple dedicated portions of the at least one network is designated based at least in part on a level of bandwidth required for one or more compute tasks to be executed by one or more compute nodes assigned to the dedicated portion of the at least one network;
to process information pertaining to at least one compute task requested within the at least one network of distributed compute nodes, wherein processing the information pertaining to the at least one compute task comprises determining at least one or more bandwidth requirements for the at least one compute task and one or more latency requirements for the at least one compute task; and
to perform, based at least in part on the assigning of the one or more available compute nodes and the processed information pertaining to the at least one compute task, at least one automated action pertaining to allocating at least a portion of the at least one compute task to at least one of the one or more available compute nodes within the at least one network, wherein performing at least one automated action comprises reserving, in connection with at least one database associated with the at least one network, capacity associated with at least a portion of the at least one available compute node in response to an indication from a given one of the multiple compute nodes within the at least one network that the given compute node will use the capacity associated with the at least a portion of the at least one available compute node in connection with executing the at least one compute task.

16. The apparatus of claim 15, wherein processing the information pertaining to multiple compute nodes comprises processing information pertaining to two or more of current compute loads within the at least one network, latency associated with each of the multiple compute nodes, bandwidth of each of the multiple compute nodes, and compute capability of each of the multiple compute nodes.

17. The apparatus of claim 15, wherein the at least one processing device is further configured:
  to maintain the at least one database based at least in part on the processed information pertaining to the multiple compute nodes, wherein maintaining the at least one database comprises updating information pertaining to one or more network parameters and one or more compute node parameters.

18. The apparatus of claim 15, wherein performing the at least one automated action comprises providing the assigning of the one or more available compute nodes to at least a portion of the distributed compute nodes within the at least one network.

19. The apparatus of claim 18, wherein the at least one processing device is further configured:
  to enable the at least a portion of the distributed compute nodes to allocate, based at least in part on the assigning of the one or more available compute nodes, at least one of application data and at least one compute task to one or more other compute nodes within the at least one network.

20. The apparatus of claim 15, wherein the at least one network of distributed compute nodes comprises at least one 5G telecommunications network.

\* \* \* \* \*